United States Patent
Immonen et al.

(10) Patent No.: US 9,408,157 B2
(45) Date of Patent: *Aug. 2, 2016

(54) POWER CONTROL

(71) Applicant: BROADCOM CORPORATION, Irvine, CA (US)

(72) Inventors: Antti Oskari Immonen, Helsinki (FI); Jouni Kristian Kaukovuori, Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/401,383

(22) PCT Filed: May 13, 2013

(86) PCT No.: PCT/IB2013/000916
§ 371 (c)(1),
(2) Date: Nov. 14, 2014

(87) PCT Pub. No.: WO2013/171562
PCT Pub. Date: Nov. 21, 2013

(65) Prior Publication Data
US 2015/0141068 A1 May 21, 2015

(30) Foreign Application Priority Data
May 14, 2012 (GB) .................................. 1208400.0

(51) Int. Cl.
*H04W 52/14* (2009.01)
*H04L 5/00* (2006.01)
*H04W 52/24* (2009.01)
*H04B 15/04* (2006.01)
*H04W 52/08* (2009.01)
*H04W 52/16* (2009.01)

(52) U.S. Cl.
CPC ............. *H04W 52/146* (2013.01); *H04B 15/04* (2013.01); *H04L 5/001* (2013.01); *H04L 5/0098* (2013.01); *H04W 52/243* (2013.01); *H04W 52/08* (2013.01); *H04W 52/16* (2013.01)

(58) Field of Classification Search
None
See application file for complete search history.

(56) References Cited

U.S. PATENT DOCUMENTS

| | | | | |
|---|---|---|---|---|
| 6,072,364 A * | 6/2000 | Jeckeln | ................ | H03F 1/3247 330/149 |
| 2003/0058511 A1* | 3/2003 | Bogod | ................ | H04B 10/504 398/194 |
| 2004/0022275 A1* | 2/2004 | Blanchard | .............. | H04B 7/216 370/535 |

* cited by examiner

*Primary Examiner* — Dominic Rego
(74) *Attorney, Agent, or Firm* — Oblon, McClelland, Maier & Neustadt, L.L.P.

(57) ABSTRACT

Measures for enabling per-carrier power control for inter-band multi-carrier capable devices, such as for example inter-band carrier aggregation capable devices. Such measures may for example comprise calculating a desired cumulative output power value for a combination of at least two uplink carriers of a terminal device, said two uplink carriers operating on different bands, setting an output power value for each of the at least two uplink carriers of the terminal device based on the calculated desired cumulative output power value, and providing, for the terminal device, a power control instruction for the at least two uplink carriers at the terminal device in accordance with the output power values set for the at least two uplink carriers.

28 Claims, 10 Drawing Sheets

POWER CONTROL

TECHNICAL FIELD

The present invention relates to power control. In particular, but not exclusively, the present invention relates to measures (including methods, apparatuses, computer software and computer program products) for enabling per-carrier power control for inter-band multi-carrier capable devices, such as for example inter-band carrier aggregation capable devices.

BACKGROUND

In modern and future (cellular) communication systems, inter-band multi-carrier capability of devices such as terminal devices is gaining more attention and importance.

For example, in 3GPP systems, inter-band carrier aggregation represents an inter-band multi-carrier communication framework which shall be supported by devices such as terminal devices. In inter-band carrier aggregation, at least two carriers operating on different (frequency) bands are aggregated together in/for at least one of downlink and uplink.

When multiple carriers operating on different (frequency) bands are combined or aggregated (which is regarded as a carrier combination/aggregation transmission mode herein), such as in inter-band carrier aggregation, intermodulation distortion (IMD) is typically produced due to nonlinearities in active and/or passive components of a device transmitter (in case of uplink transmission), a device receiver (in case of downlink transmission) or a device transceiver (in both cases). Generally, intermodulation distortion components of $(m+n)$-th order are located at frequencies $m*f_1 \pm n*f_2$. For instance, assuming that uplink carriers at frequencies $f_{UL1}$ and $f_{UL2}$ are combined or aggregated, a second order intermodulation distortion component is located at one of frequencies $2*f_{UL1}$, $2*f_{UL2}$, and $f_{UL1} \pm f_{UL2}$, and a third order intermodulation component is located at one of frequencies $3*f_{UL1}$, $3*f_{UL2}$, $2*f_{UL1} \pm f_{UL2}$, $f_{UL1} \pm 2*f_{UL2}$, and so on.

When at least one (or part) of the intermodulation distortion components falls in a (frequency) band being used for some transmission operation by the device in question, for example a DL carrier, such intermodulation distortion can cause a significant amount of desensitization. Such desensitization is specifically applicable for certain (inter-band) combinations of standardized carriers depending on the frequency relations between uplink and downlink channel definitions.

For certain frequency relations between uplink and downlink channel definitions, (part of) intermodulation distortion components of uplink carrier combinations are produced on top of a downlink carrier and thus destroy the performance thereof, if no power control (for example power restrictions) is in place. Referring to 3GPP uplink and downlink channel definitions according to 3GPP TS 36.104 (Table 5.5-1), for example, aggregating bands (i.e. aggregating component carriers operating on bands) B20 and B8 causes a third order intermodulation distortion component from B20 UL (832-862 MHz) and B8 UL (880-915 MHz) to overlap with B8 DL (925-960 MHz). Furthermore, (part of) intermodulation distortion components can also be produced on top of some non-3GPP Radio Access Technology (RAT), for instance in the 2.4 GHz frequency band (ISM band) used for example by WLAN and Bluetooth. For instance, this is the case for the second order intermodulation distortion component when aggregating bands B4 and B12.

The intermodulation problem as outlined above, i.e. an excessive desensitization of some operating bands/carriers (for example a DL carrier in case of a multi-band UL carrier combination), can be avoided if the intermodulation power of an intermodulation distortion component is sufficiently low as compared with the actual transmission power of that operating band/carrier (for example below a reference sensitivity level). For instance, desensitization could be considered to be not significant when smaller than 0.5 dB.

However, there are currently no means for reliably and efficiently ensuring such a sufficiently low level of desensitization in the context of intermodulation distortion for inter-band multi-carrier combinations or aggregations, particularly whilst avoiding coverage problems and enabling flexible power control for multiple uplink carriers.

Using power restriction values for instructing inter-band multi-carrier power control at terminal devices by a network entity such as a base station is not effective in terms of at least one of coverage and control flexibility. Rather, a controlling network entity using power restriction values for power control instructions will not know exact output powers actually being used for individual uplink carriers at terminal devices based on such instructions.

Thus, there is a desire to improve power control for inter-band multi-carrier capable devices. More specifically, there is a desire to improve power control for inter-band multi-carrier capable devices in terms of at least one of coverage and control flexibility, for example in the context of inter-band carrier aggregation.

SUMMARY

Various exemplary embodiments of the present invention aim at addressing at least part of the above issues and/or problems and drawbacks.

Various aspects of exemplary embodiments of the present invention are set out in the appended claims.

In accordance with a first aspect the present invention, there is provided a method for enabling per-carrier power control on a network side of a cellular system, the method comprising:

calculating a desired cumulative output power value for a combination of at least two uplink carriers of a terminal device, the two uplink carriers operating on different bands, the calculation being based on an intermodulation power equation for the intermodulation power of a specific order intermodulation distortion of the at least two uplink carriers;

setting an output power value for each of the at least two uplink carriers of the terminal device based on the calculated desired cumulative output power value; and providing, for the terminal device, a power control instruction for the at least two uplink carriers at the terminal device in accordance with the output power values set for the at least two uplink carriers.

In accordance with a second aspect the present invention, there is provided a method for enabling per-carrier power control on a terminal side of a cellular system, the method comprising:

obtaining an instruction for power control for at least two uplink carriers of a terminal device, the instruction comprising a setting of output power values of the at least two uplink carriers, the two uplink carriers operating on different bands, the setting being based on a desired cumulative output power value for a combination of the at least two uplink carriers of the terminal device, which is based on an intermodulation power equation for the intermodulation power of a specific order intermodulation distortion of the at least two uplink carriers; and performing power control for the at least two uplink carriers in accordance with the obtained power control instruction at the terminal device.

In accordance with a third aspect the present invention, there is provided apparatus for use in enabling per-carrier power control on a network side of a cellular system, the apparatus comprising a processing system adapted to cause the apparatus to:

calculate a desired cumulative output power value for a combination of at least two uplink carriers of a terminal device, the two uplink carriers operating on different bands, the calculation being based on an intermodulation power equation for the intermodulation power of a specific order intermodulation distortion of the at least two uplink carriers;

set an output power value for each of the at least two uplink carriers of the terminal device based on the calculated desired cumulative output power value; and provide, for the terminal device, a power control instruction for the at least two uplink carriers at the terminal device in accordance with the output power values set for the at least two uplink carriers.

In accordance with a fourth aspect the present invention, there is provided apparatus for use in enabling per-carrier power control on a terminal side of a cellular system, the apparatus comprising a processing system adapted to cause the apparatus to:

obtain a power control instruction for at least two uplink carriers of a terminal device, the instruction comprising a setting of output power values of the at least two uplink carriers, the two uplink carriers operating on different bands, the setting being based on a desired cumulative output power value for a combination of the at least two uplink carriers of the terminal device, which is based on an intermodulation power equation for the intermodulation power of a specific order intermodulation distortion of the at least two uplink carriers; and perform power control for the at least two uplink carriers in accordance with the obtained power control instruction at the terminal device.

A processing system according to aspects of the present invention may comprise at least one processor, at least one memory including computer program code, and at least one interface configured for communication with at least another apparatus, the at least one processor, with the at least one memory and the computer program code, being configured to cause the apparatus to operate as described herein.

In accordance with a fifth aspect the present invention, there is provided computer software adapted to perform a method for enabling per-carrier power control according to the first aspect of the present invention.

In accordance with a sixth aspect the present invention, there is provided computer software adapted to perform a method for enabling per-carrier power control according to the second aspect of the present invention.

In accordance with a seventh aspect the present invention, there is provided a computer program product comprising a non-transitory computer-readable storage medium having computer readable instructions stored thereon, the computer readable instructions being executable by a computerized device to cause the computerized device to perform a method for enabling per-carrier power control according to the first aspect of the present invention.

In accordance with an eighth aspect the present invention, there is provided a computer program product comprising a non-transitory computer-readable storage medium having computer readable instructions stored thereon, the computer readable instructions being executable by a computerized device to cause the computerized device to perform a method for enabling per-carrier power control according to the second aspect of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned aspects of the present invention are set out in the following.

By virtue of any one of the aforementioned aspects of the present invention, an improved power control for inter-band multi-carrier capable devices in terms of at least one of coverage and control flexibility, for example in the context of inter-band carrier aggregation, is achieved. By virtue of any one of the aforementioned aspects of the present invention, a power level scheduling mechanism is achieved, by which individual uplink carriers (at individual transmitters) at terminal devices are assignable such that intermodulation distortion is at least mitigated.

By way of embodiments of the present invention, there is provided per-carrier power control for inter-band multi-carrier capable devices. More specifically, by way of embodiments of the present invention, there are provided measures and mechanisms for enabling per-carrier power control for inter-band multi-carrier capable devices (in/for cellular communication systems), such as for example inter-band carrier aggregation capable devices. Thereby, corresponding enhancements are achieved in this regard.

Further features and advantages of the invention will become apparent from the following description of preferred embodiments of the invention, given by way of example only, which is made with reference to the accompanying drawings.

DETAILED DESCRIPTION

Aspects of the present invention will be described herein below. More specifically, aspects of the present invention are described hereinafter with reference to particular non-limiting example embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described embodiments. As such, the description of embodiments given herein specifically refers to terminology which is directly related thereto. Such terminology is only used in the context of the presented non-limiting examples, and naturally does not limit the invention in any way. Rather, any other network configuration or system deployment, etc. may also be utilized as long as compliant with the features described herein.

In particular, the present invention and its embodiments may be applicable in any (cellular) communication system and/or network deployment operable with inter-band multi-carrier capable devices, for example in any (cellular) communication system and/or network deployment supporting inter-band carrier aggregation or the like.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to embodiments of the present invention, in general terms, there are provided mechanisms, measures and means for enabling per-carrier power control for inter-band multi-carrier capable devices.

In the following, embodiments of the present invention are described with reference to methods, procedures and functions, as well as with reference to structural arrangements and configurations.

More specifically, without restricting generality, the present invention and embodiments thereof are described with reference to a 3GPP-based LTE communication system and inter-band carrier aggregation therein. As used herein, any references to aggregation or combination of bands (in the context of carrier aggregation) encompasses or corresponds to aggregation or combination of component carriers operating on respective bands.

Figure 1:
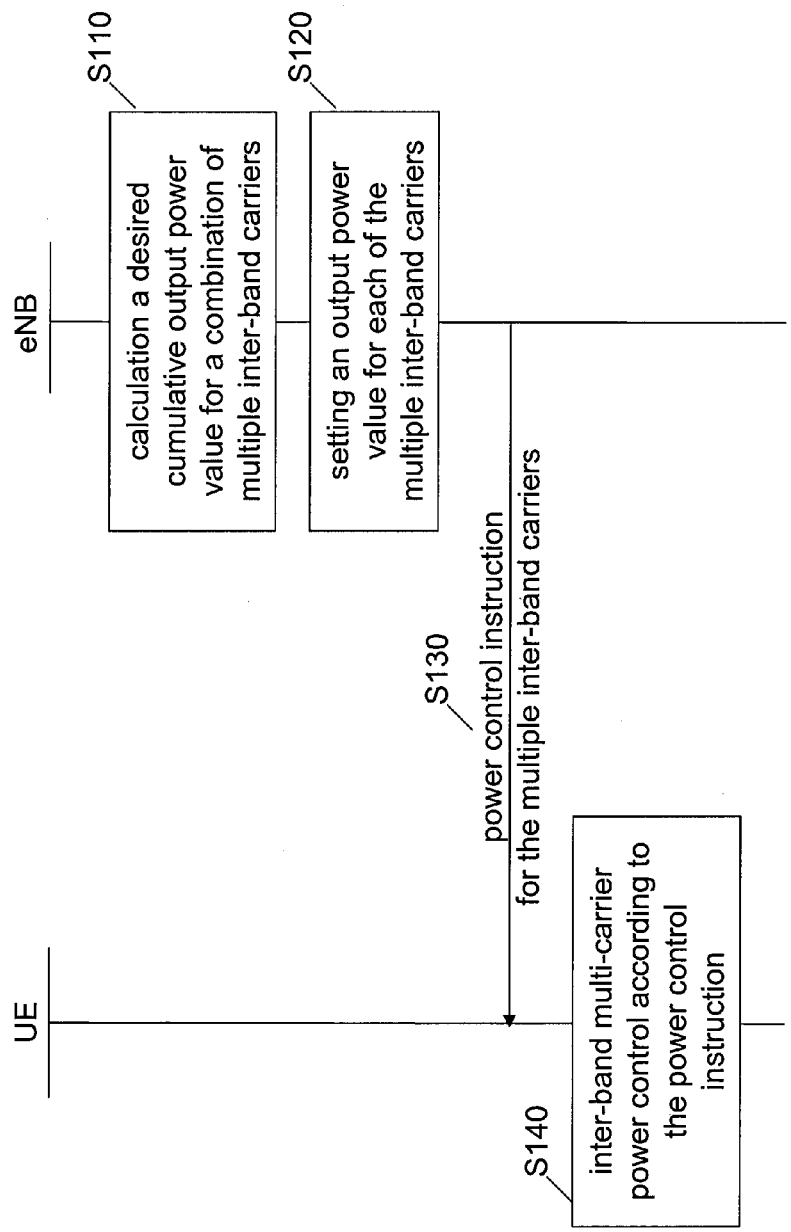
FIG. 1 shows a schematic diagram of an exemplary procedure according to embodiments of the present invention.

FIG. 1 shows a schematic diagram of an exemplary procedure according to embodiments of the present invention.

As shown in FIG. 1, a procedure according to embodiments of the present invention comprises the following operations/functions.

At the network side, i.e. at a base station or access node such as an eNB or the like, there are performed an operation (S110) of calculating a desired cumulative output power value for a combination of at least two uplink carriers of a terminal device such as a UE or the like, said two uplink carriers operating on different bands, an operation (S120) of setting an output power value for each of the at least two uplink carriers of the terminal device based on the calculated desired cumulative output power value, and an operation (S130) of providing, for the terminal device, a power control instruction for the at least two uplink carriers at the terminal device in accordance with the setting of the output power values of the at least two uplink carriers, i.e. instructing the terminal device for/about a corresponding power control, for example by transmitting a corresponding power control instruction. At the device/terminal side, i.e. at the device or terminal such as a UE, there are performed an operation (S130) of obtaining an instruction for power control for the at least two uplink carriers with the setting of the output power values of the at least two uplink carriers, i.e. being instructed for/about a corresponding power control by the base station, for example by receiving a corresponding power control instruction, and an operation (S140) of performing power control for the at least two uplink carriers in accordance with the obtained power control instruction.

According to embodiments of the present invention, the calculation operation is based on an intermodulation power equation for the intermodulation power of a specific order intermodulation distortion of the at least two uplink carriers. This is explained in detail below with reference to FIG. 2.

According to embodiments of the present invention, the calculation operation takes into account (as at least one parameter of the intermodulation power equation being used) a limiting intermodulation factor in/of the terminal device, i.e. a factor which defined the most stringent requirement for output power considerations. Stated in other words, the intermodulation power equation being used relates to a limiting intermodulation factor in/of the terminal device. Typically, such a limiting intermodulation factor relates to the limiting linearity factor, i.e. a factor being effective for the nonlinearity in active and/or passive components of a device transmitter, receiver or a transceiver. For example, such a limiting linearity factor may refer to an antenna switch specification. As such an antenna switch specification is often the most limiting linearity factor, the below description is exemplarily based on a corresponding assumption. That is, the device-specific intermodulation performance parameter representing the limiting intermodulation factor is exemplarily assumed to be the intermodulation performance parameter for example of a front-end antenna switch, such as the second order intermodulation performance parameter (IIP2) and/or the third-order intermodulation performance parameter (IIP3).

The eNB can fix equation(s) or the parameter value(s) thereof based on an actual performance of the limiting factor (for example actual antenna switch performance, wherein such information can be achieved for example by deducing actual desensitization of DL carrier with certain output power values, etc.).

Figure 2:
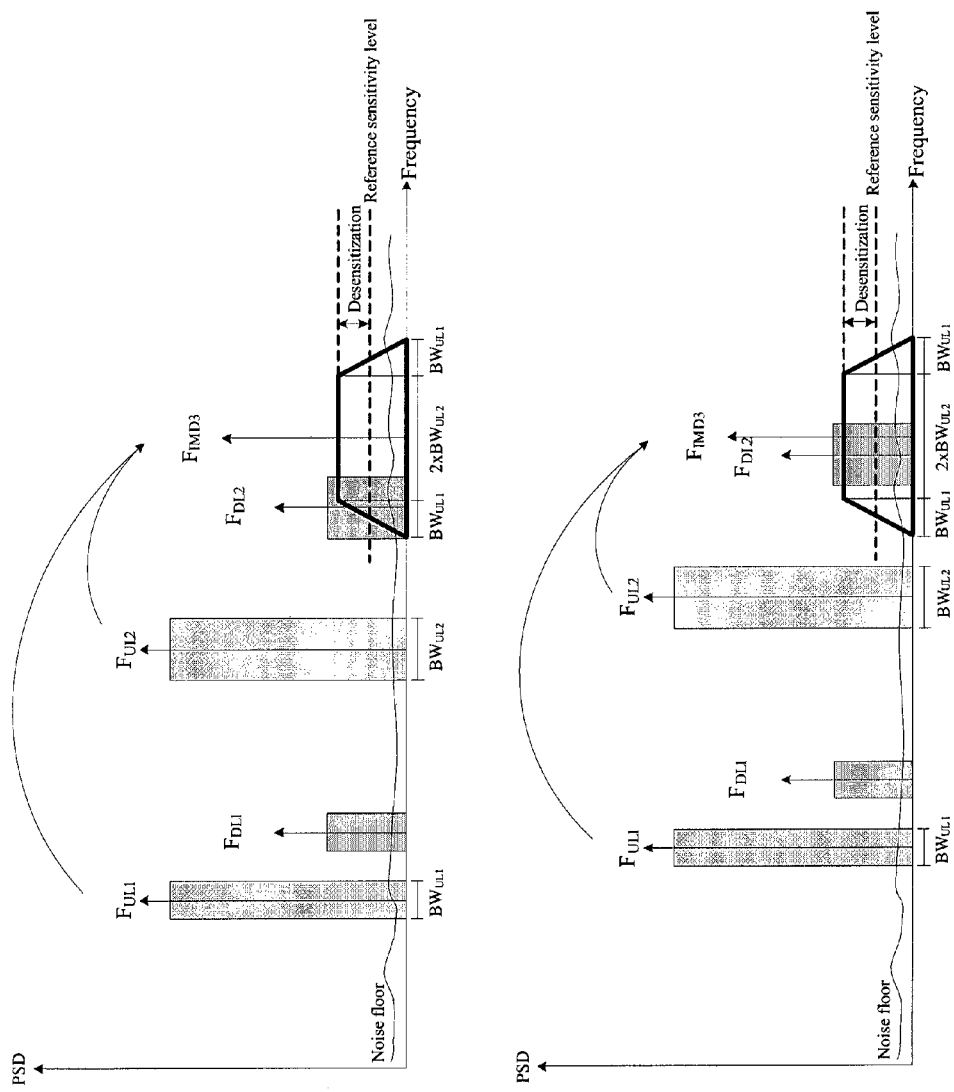
FIG. 2 shows a diagram of examples of third order intermodulation distortion on a downlink band, for which embodiments of the present invention are applicable.

FIG. 2 shows a diagram of examples of third order intermodulation distortion on a downlink band, for which embodiments of the present invention are applicable. In FIG. 2, the power spectral density (PSD) is plotted against frequency.

For the example of FIG. 2, it is generally assumed that two uplink carriers of different bands are combined, wherein (part of) a third order intermodulation distortion component is caused to appear on the downlink carrier of one of the two different bands. For illustrating the different effects of the two uplink carriers in the third order intermodulation distortion component, the two different bands are exemplarily assumed to have different bandwidths. In this regard, it is to be noted that, according to operational use cases, bandwidths of different bands may be also equal, and embodiments of the present invention are equally applicable for bands with the same or different bandwidths. In the present example, output powers of two uplink carriers may vary independently according to network power control for both components, and it is to be noted that embodiments of the present invention are equally applicable for any output powers and output power relationships of bands. Further, it is assumed that the third order intermodulation distortion component exhibits twice the effect of the uplink carrier 2 as compared with the uplink carrier 1, i.e. $F_{IMD3}=F_{UL1}\pm 2*F_{UL2}$. This is evident from the illustration of FIG. 2 in that the UL2 carrier/band is closer to the band of the IMD3 product in the frequency domain than the UL1 carrier/band. Accordingly, the downlink carrier of the second band suffers from desensitization, as described above.

Generally, it is to be noted that the following equations adopt simple adding operations, thus combining powers herein is simple, for instance 10 dB+10 dB=20 dB and not 13 dB.

It is to be noted that such calculation approach is not to be mixed with the fact that, when combined output power at each antenna connector/port or TX chain is measured, the sum is +20 dBm+20 dBm=+23 dBm, for example. Namely, irrespective of the calculation approach used herein, the combined maximum output power Pout, which shall not exceed the Pout defined by UE Power Class, is actually calculated logarithmically.

Further, the following may generally be assumed for the further description.

The eNB knows problematic band combinations. This is feasible, as the intermodulation relation can be calculated.

The eNB knows which channel allocations have intermodulation relationships. This is feasible, as all operators know if their spectrums have intermodulation relationships.

The eNB has basic IIP2 and IIP3 formulas stored (or has the information of these somewhere available).

The eNB has basic knowledge of UE component data (such as for example antenna isolation $ANT_{ISOLATION}$ (typically 10 . . . 20 dB), antenna switch or front-end module switch linearity IIP2 and IIP3 (typically 80 . . . 90 dB and 60 . . . 70 dB, respectively, etc.).

The eNB is aware of coverage limitations, i.e. it can monitor the received signal strength.

In case of second order intermodulation, the intermodulation power of intermodulation (IMD2) is given by $$P_{IMD2}=Px+Py-IIP2, \quad (1)$$

wherein Px is the power of the victim band uplink (for example UL2), Py is the power of the jammer band uplink (for example UL1), i.e. the power of another (isolated) uplink antenna, and IIP2 is the second order intermodulation performance parameter for example of a front-end antenna switch.

The equation (1) can be written as $$P_{IMD2}=P1+(P2-ANT_{ISOLATION})-IIP2, \quad (2)$$

wherein P1 and P2 are the TX powers of the uplinks UL1 and UL2, respectively, $ANT_{ISOLATION}$ is an antenna isolation (namely, an isolation provided by some component in the front-end, such as a duplexer, an antenna switch, etc.), and IIP2 is the intermodulation performance parameter.

In case of third order intermodulation, the intermodulation power of intermodulation (IMD3) is given by $$P_{IMD3}=2\cdot Px+Py-2\cdot IIP3, \quad (3)$$

and equation (3) can be written as $$P_{IMD3}=2\cdot P1+(P2-ANT_{ISOLATION})-2\cdot IIP3, \quad (4)$$

wherein IIP3 is the third order intermodulation performance parameter for example of a front-end antenna switch.

Any one of equations (2) and (4) could for example be used for the aforementioned calculation operation, namely by calculating as the desired cumulative output power value for IMD2 and IMD3, respectively:

$$P1+P2=P_{IMD2}+ANT_{ISOLATION}+IIP2 \quad (5)$$

$$2\cdot P1+P2=P_{IMD3}+ANT_{ISOLATION}+2\cdot IIP3 \quad (6)$$

Referring to the upper and lower parts of FIG. 2, it is evident that the amount of overlapping of the intermodulation distortion in question and the thus distorted DL band (or wanted channel) may be variable. Accordingly, a measure of such overlapping could additionally be taken into consideration, thereby improving accuracy of corresponding calculations. If so, the above equations (2) and (4) could be modified as follows:

$$P_{IMD2}=P1+(P2-ANT_{ISOLATION})-IIP2+k_{IMD2} \quad (7)$$

$$P_{IMD3}=2\cdot P1+(P2-ANT_{ISOLATION})-2\cdot IIP3+k_{IMD3}, \quad (8)$$

wherein $k_{IMD2}$ and $k_{IMD3}$ represent terms which indicate the amount of intermodulation distortion (IMD) overlapping with a wanted channel. If the IMD overlaps completely, as in the lower part of FIG. 2, k=0 can be set. If the IMD overlaps only partially, as in the upper part of FIG. 2, k can be set to a negative value (in decibels) corresponding to the extent of overlapping. The corresponding k parameters can be computed when the UL allocations (for example number of RBs, frequency areas, etc.) are known.

Any one of equations (7) and (8) could for example be used for the aforementioned calculation operation, namely by calculating as the desired cumulative output power value for IMD2 and IMD3, respectively:

$$P1+P2=P_{IMD2}+ANT_{ISOLATION}+IIP2-k_{IMD2} \quad (9)$$

$$2\cdot P1+P2=P_{IMD3}+ANT_{ISOLATION}+2\cdot IIP3\cdot k_{IMD3} \quad (10)$$

In the above equations, $ANT_{ISOLATION}$ and IIP2/IIP3 represent device-specific parameters of the device in question, for example a terminal device such as a UE. The antenna isolation is a device-specific parameter/value which alters between at least one of devices, antennas, frequencies, active antenna locations, and use cases (hand effects, mechanical structures positioning, etc.), and the intermodulation performance parameters IIP2/IIP3 are device-specific (typically component) parameters/values, i.e. constants typically given (guaranteed) by the component manufacturer. Further, $P_{IMD2}/P_{IMD2}$ represent an allowable intermodulation power parameter, and $k_{IMD2}/k_{IMD2}$ represent an effective intermodulation power parameter.

Accordingly, the eNB is able to calculate the desired cumulative output power value based on an intermodulation power equation relating to a limiting intermodulation factor in/of the terminal device, when target IMD levels (i.e. an allowable intermodulation power parameter for the specific order IMD in question) and component data (i.e. device-specific parameters of the device in question) are known.

According to embodiments of the present invention, the operation is based on the outcome of the calculation operation as outlined above. Namely, on the basis of the calculated desired cumulative output power value (for example P1+P2 for IMD2, 2·P1+P2 for IMD3), the eNB is able to set the individual output power values for each of the at least two uplink carriers, i.e. P1 and P2, respectively. Namely, the eNB can freely choose which UL is given which portion of the total available output power corresponding to the desired cumulative output power value, such that the combined maximum output power Pout defined by UE Power Class is not exceeded (by the sum of P1 and P2). Therefore, whilst the eNB may assign equal output power values to all UL carriers, the eNB may also assign unequal output power values to the individual UL carriers, thereby prioritizing the UL carriers in terms of output power or, stated in other words, applying some output-power related prioritization (i.e. using a prioritization scheme) for the UL carriers.

For instance, if equation (5) or (9) gives P1+P2=30 dBm, the eNB could choose to prioritize UL1 and assign say 20 dBm for P1 and the remaining 10 dBm for P2. If no prioritization was used, then powers P1 and P2 can be assumed to be equal (for example 15 dBm for P1 and 15 dBm for P2). For instance, if equation (6) or (10) gives 2·P1+P2=50 dBm, the eNB could choose to prioritize UL2 and assign say 20 dBm for P2 and the remaining 15 dBm for P1. If no prioritization is used, then powers P1 and P2 can be assumed to be equal (for example 16.67 dBm for P1 and 16.67 dBm for P2).

According to embodiments of the present invention, the intermodulation power equation and/or one or more of the parameters thereof, which is used for the calculation operation, may be fixed/constant or variable/flexible.

In case of a fixed/constant equation and/or parameter/s, these could be based on some basic assumptions (for example for $P_{IMD2}$, $P_{IMD3}$, $ANT_{ISOLATION}$, IIP2, IIP3). Most of these can for example be obtained from technical specifications in standards or from UE vendors whose UEs are used. Such assumptions or values may be preconfigured, for example pre-stored. Accordingly, the same equation and/or parameter/s may be used irrespective of changing conditions.

In case of a variable/flexible equation and/or parameter/s, these could be based on any one of current system conditions as well as preferences and/or data at the network side and/or the terminal side. Accordingly, the varying equations and/or parameter/s may be used in view of changing conditions. Such variability is depicted in FIG. 3.

Figure 3:
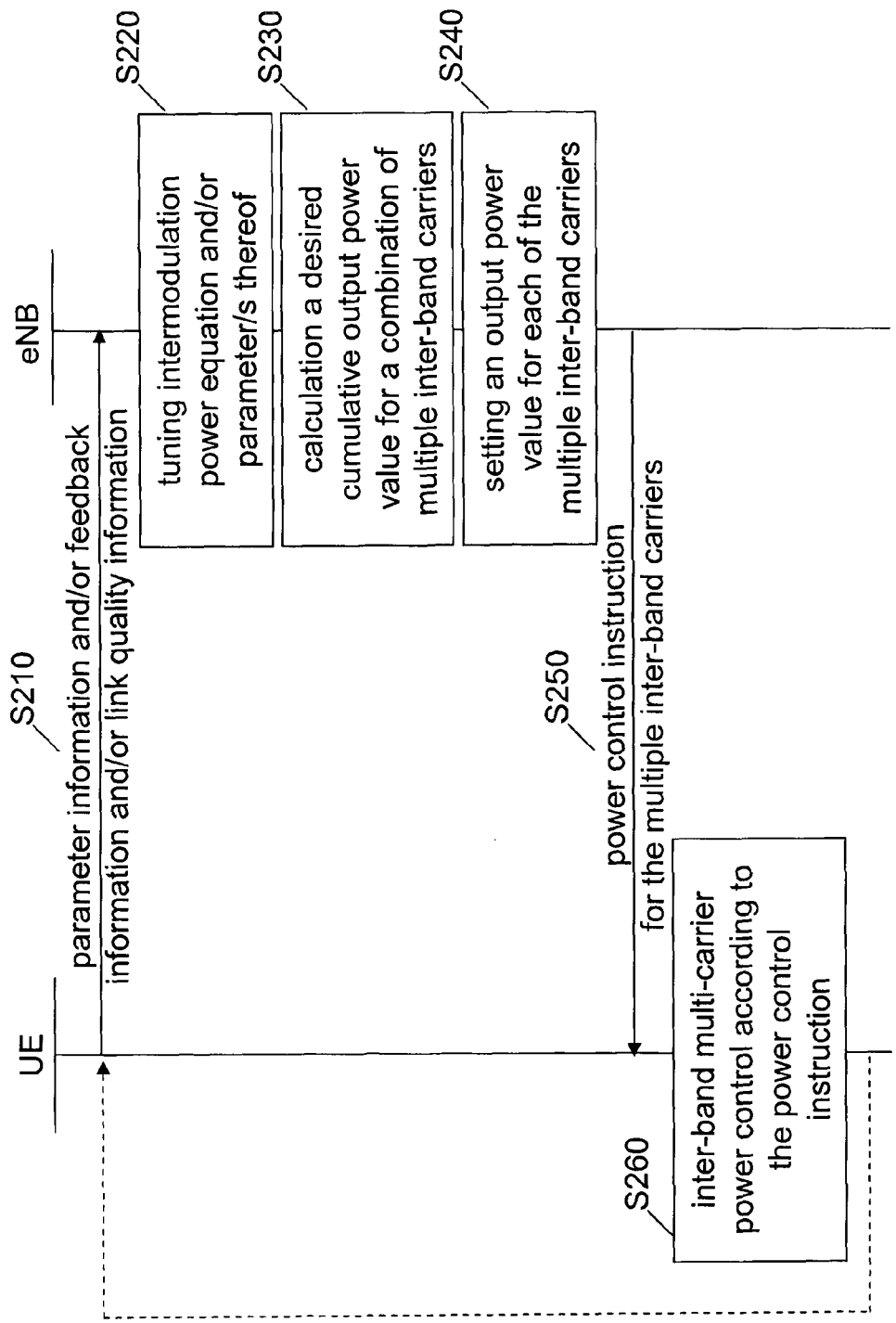
FIG. 3 shows a schematic diagram of another exemplary procedure according to embodiments of the present invention.

FIG. 3 shows a schematic diagram of another exemplary procedure according to embodiments of the present invention.

As shown in FIG. 3, operations S230 to S260 correspond to operations S110 to S140 according to FIG. 1. Accordingly, reference is made to the above for details in this regard. As shown in FIG. 3, the variability of the calculation and/or setting operations is realized by way of an operation (S210) of providing corresponding information from the terminal device to the base station or the like, and an operation (S220) of tuning (i.e. adjusting) the intermodulation power equation and/or one or more of the parameters thereof. Optionally, the setting operation S240 may also be tuned (i.e. adjusted) based on the thus provided information. For example, the basic information underlying such tuning/adjustment could be one or more of parameter information, which is indicative of values (for example $P_{IMD2}$, $P_{IMD3}$, $ANT_{ISOLATION}$, IIP2, IIP3) and/or combined values (for example $ANT_{ISOLATION}$–IIP2) of one or more of an allowable intermodulation power parameter, an effective intermodulation power parameter and one or more device-specific intermodulation performance parameters of the terminal device, feedback information, which is indicative of downlink performance at the terminal device, and link quality information, which is indicative of uplink link quality on the at least two uplink carriers.

As indicated by a dashed arrow in FIG. 3, the procedure may be repeated or may be executed in a periodic or iterative manner.

According to embodiments of the present invention, the tuning/adjusting operation used herein may be configured to cope with any conceivable errors, such as for example errors due to tolerances defined in standard specifications. For example, the tuning/adjusting operation according to embodiments of the present invention may be configured to cope with errors due to tolerances defined for the configured output power. As defined for example Table 6.2.5-1 in 3GPP TS 36.101, the typical tolerance for maximum output power is 2 dB with maximum output power values but can be up to 7 dB with lower output power values. Such tolerances may be taken into account here accordingly.

According to embodiments of the present invention, parameter values and/or equations for power control calculations can be set, output power values can be calculated and set based thereon, and the output power values may be communicated to the UE.

On the one hand, the allowable intermodulation power parameter, i.e. values for $P_{IMD2}$, $P_{IMD3}$, can be set or determined by the eNB based on a desired (target) victim DL performance at the UE. The better DL performance that is required, the lower the $P_{IMD2}$, $P_{IMD3}$ values. As can be seen from FIG. 2, an overly strong IMD causes receiver desensitization, thus limiting the received signal quality. The level of IMD shall for example be sufficiently below the sum of the received signal power and the signal-to-noise level target and the fading margin, etc.

On the other hand, the intermodulation power equation and/or one or more of the parameters can be adjusted in accordance with at least one of parameter information received from the terminal device, which is indicative of values and/or combined values of one or more of the parameters, and feedback information received from the terminal device, which is indicative of downlink performance at the terminal device. Also, the setting operation (i.e. the prioritization) can be adjusted in accordance with link quality information from the terminal device, which is indicative of uplink link quality on the at least two uplink carriers, as explained in more detail below with reference to FIG. 7.

The eNB can fix equation(s) or the parameter value(s) thereof based on DL feedback values such as CQI and the like. Also, the eNB can fix equation(s) or the parameter value(s) thereof, if the eNB considers that the equation(s) used in calculations to assign powers for UL carriers results in inappropriate (for example too optimistic or too pessimistic) power values. In the case of too pessimistic power values being given, the power levels are too low compared to what they could be without desensitizing the victim DL carrier more than desired. In such a case, the UE can signal an indication of DL performance (as a normal standard procedure) that tells the eNB that the DL performance is better than anticipated or expected. In the case of too optimistic power values being given, the power levels are too high compared to what they could be without desensitizing the victim DL carrier more than desired. In such a case, the UE can signal an indication of DL performance (as a normal standard procedure) that tells the eNB that the DL performance is worse than anticipated or expected.

Accordingly, the eNB can fix equation(s) or the parameter value(s) thereof by simply using the DL performance indication(s) signaled by the UE. If the desired performance is not met, then the value of $P_{IMD2}$ or $P_{IMD3}$ can be tightened (lowered), which means that the eNB cannot allocate as high an output power from the UL bands. If RSRQ or some other measure reveals that the victim DL carrier performs better than anticipated, then the eNB can increase the value of $P_{IMD2}$ or $P_{IMD3}$ value, which enables the eNB to require more output power from the UL bands.

In view thereof, when the victim DL desensitization is at a value higher or lower than expected or desired (i.e. the DL performance is worse or better than anticipated), the underlying equation(s) or the parameter value(s) thereof can be tuned, i.e. corrected using corresponding correction factors and/or terms based on a corresponding feedback from the UE. Otherwise, when the victim DL desensitization is at a value as expected or desired (i.e. the DL performance is as anticipated), the underlying equation(s) or the parameter value(s) thereof can be maintained (for example a preceding tuning is completed).

In the following, various use cases according to embodiments of the present invention are illustrated and explained.

Figure 4:
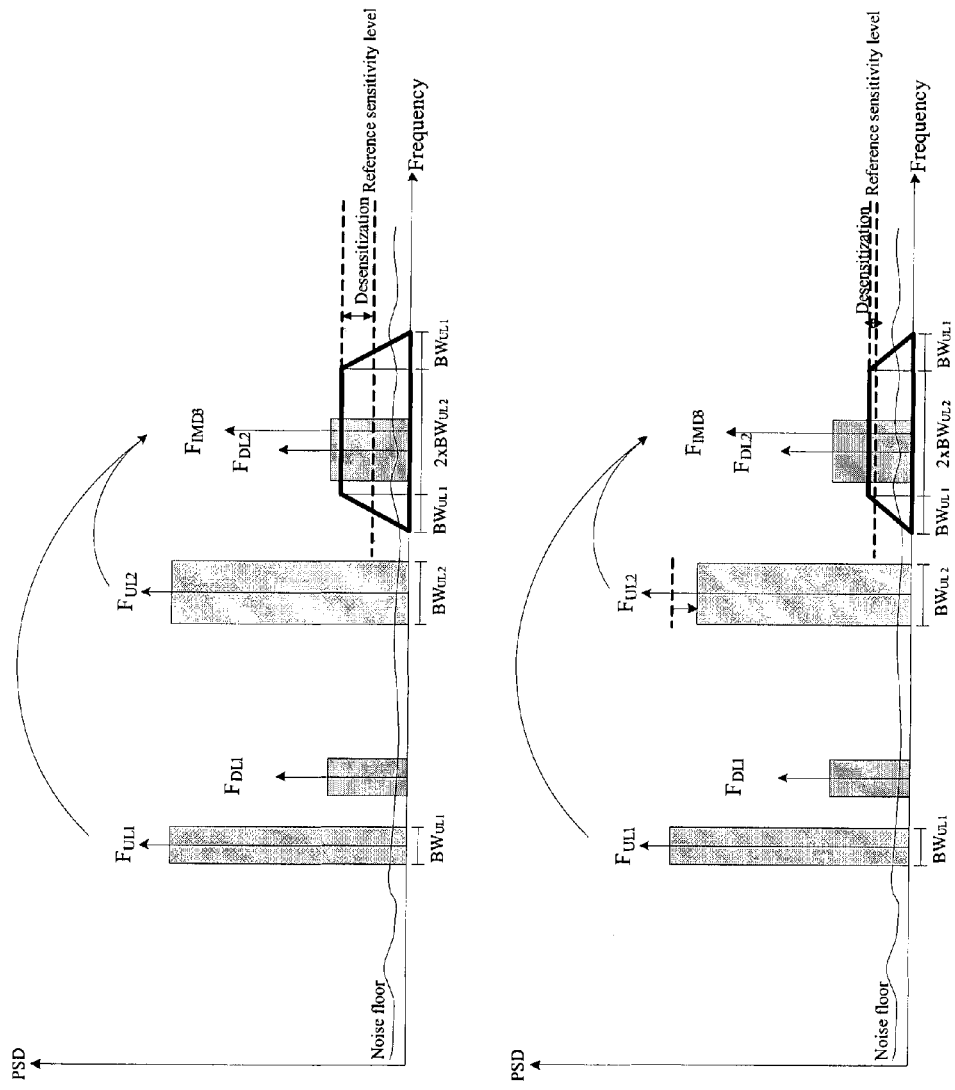
FIG. 4 shows a diagram of examples of third order intermodulation distortion on a downlink band with application of power control according to embodiments of the present invention.

FIG. 4 shows a diagram of examples of third order intermodulation distortion on a downlink band with application of power control according to embodiments of the present invention.

The upper and lower parts of FIG. 4 show the intermodulation before and after power control (for example including the aforementioned tuning). Firstly, in the upper part situation, the UE may report rather poor received signal quality compared to received input signal level. Then, the eNB may take the action and reduce the UL2 output power, as indicated in the lower part situation. It is to be noted that any power change such as the present power reduction could happen gradually or, if an equation/parameter set shows a large power change (for example reduction) is needed, then a bigger power (for example down) step could be performed first, followed by smaller power (for example down) steps. Also, some hysteresis may be adopted in this regard.

Accordingly, the desensitization amount could be lowered in accordance with a prioritization based on DL performance on a DL carrier, on which intermodulation distortion is caused by the output power of said UL carrier, and the influence of the output power of said UL carrier on the intermodulation distortion on said DL carrier.

Figure 5:
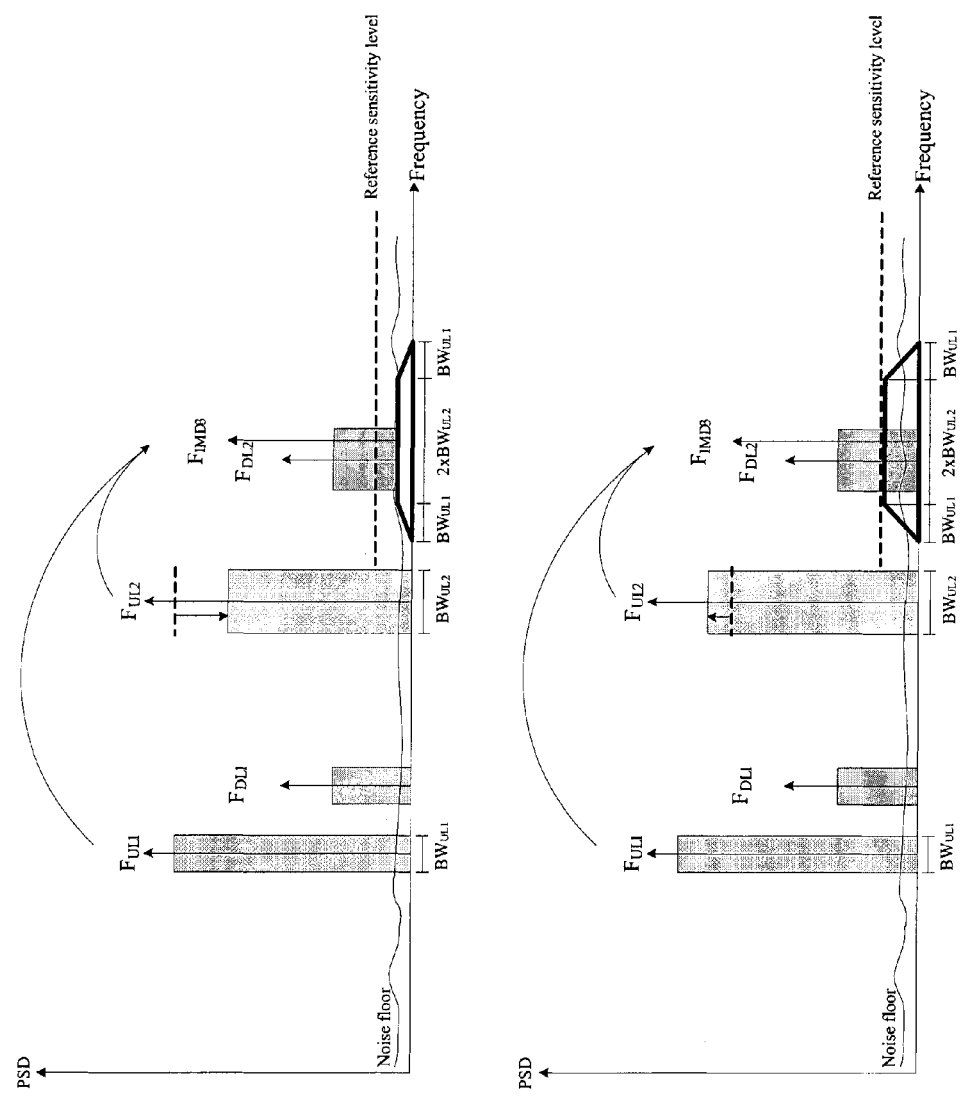
FIG. 5 shows a diagram of further examples of third order intermodulation distortion on a downlink band with application of power control according to embodiments of the present invention.

FIG. 5 shows a diagram of further examples of third order intermodulation distortion on a downlink band with application of power control according to embodiments of the present invention.

Again, the upper and lower parts of FIG. 5 show the intermodulation before and after power control (for example including the aforementioned tuning). In the upper part situation, DL2 signal quality is rather good and UL2 capacity could be increased, if UL2 power was higher. The eNB observes that it is possible to add UL2 power without (overly) deteriorating DL2 reception quality. Then, the eNB may take the action and increase the UL2 output power, as indicated in the lower part situation.

Accordingly, the desensitization amount could be lowered in accordance with a prioritization based on UL capacity increase capability on said UL carrier based on associated DL performance deterioration on a DL carrier, on which intermodulation distortion is caused by the output power of said UL carrier.

Figure 6:
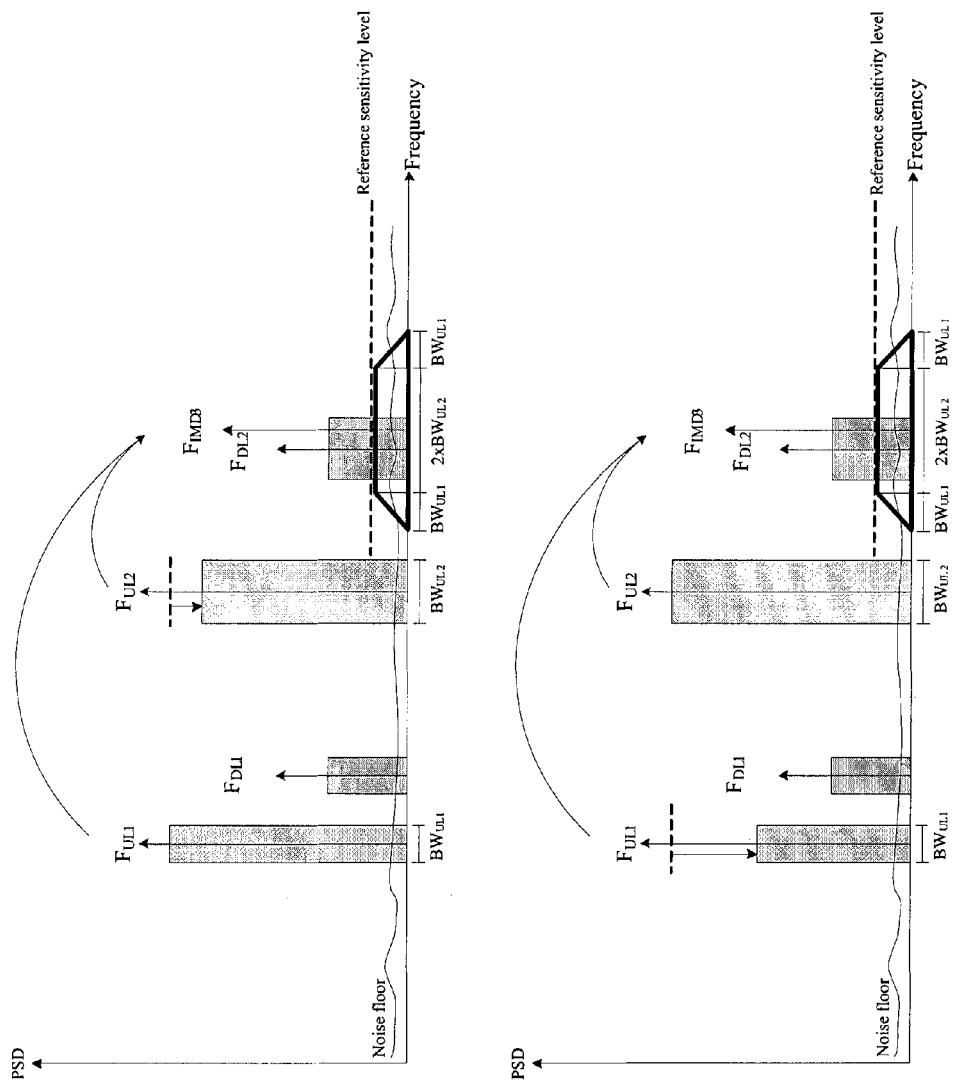
FIG. 6 shows a diagram of examples of third order intermodulation distortion on a downlink band with application of power control based on output power-related prioritization according to embodiments of the present invention.

FIG. 6 shows a diagram of examples of third order intermodulation distortion on a downlink band with application of power control based on output power-related prioritization according to embodiments of the present invention.

In the upper part situation of FIG. 6, UL1 is prioritized and thus the UL2 power (P2) is decreased. Alternatively, in the lower part situation of FIG. 6, UL2 is prioritized and thus the UL1 power (P1) is decreased. Since in this particular example UL1 has a lesser effect on the IMD3 result (see above equations), since the UL1 carrier/band is further away from the IMD3 product in the frequency domain than the UL2 carrier/band, the power of UL1 is decreased by a larger amount as compared to the UL2 power reduction in the upper part situation.

Accordingly, the desensitization amount could be lowered in accordance with a prioritization based on a relationship between a frequency range of the band of an UL carrier in question and a frequency range of intermodulation power of a specific order intermodulation distortion of the at least two UL carriers, i.e. a relationship between UL frequency location and IMD component. Namely, the closer the UL carrier in question is to the victim DL carrier, the stronger is its influence on the IMD3 power, and therefore power reduction of this UL carrier is more efficient.

Also, the desensitization amount could be lowered in accordance with a prioritization based on at least one of a relationship between frequency ranges of the bands of the at least two UL carriers and channel allocations on the at least two UL carriers. For example in the case of a carrier aggregation of bands B8 and B20, both ULs can deteriorate both DLs. Thus, depending on the channel allocations, the k factors might be different. Then, the power calculation/optimization could be performed such that the worst DL signal quality degradation is prioritized. Further, the desensitization amount could be lowered in accordance with a prioritization based on UL data amount (as it is better to decrease the power of the UL carrier having less traffic).

As explained below with reference to FIG. 7, coverage considerations could also be taken into account in terms of output power-related prioritization.

Figure 7:
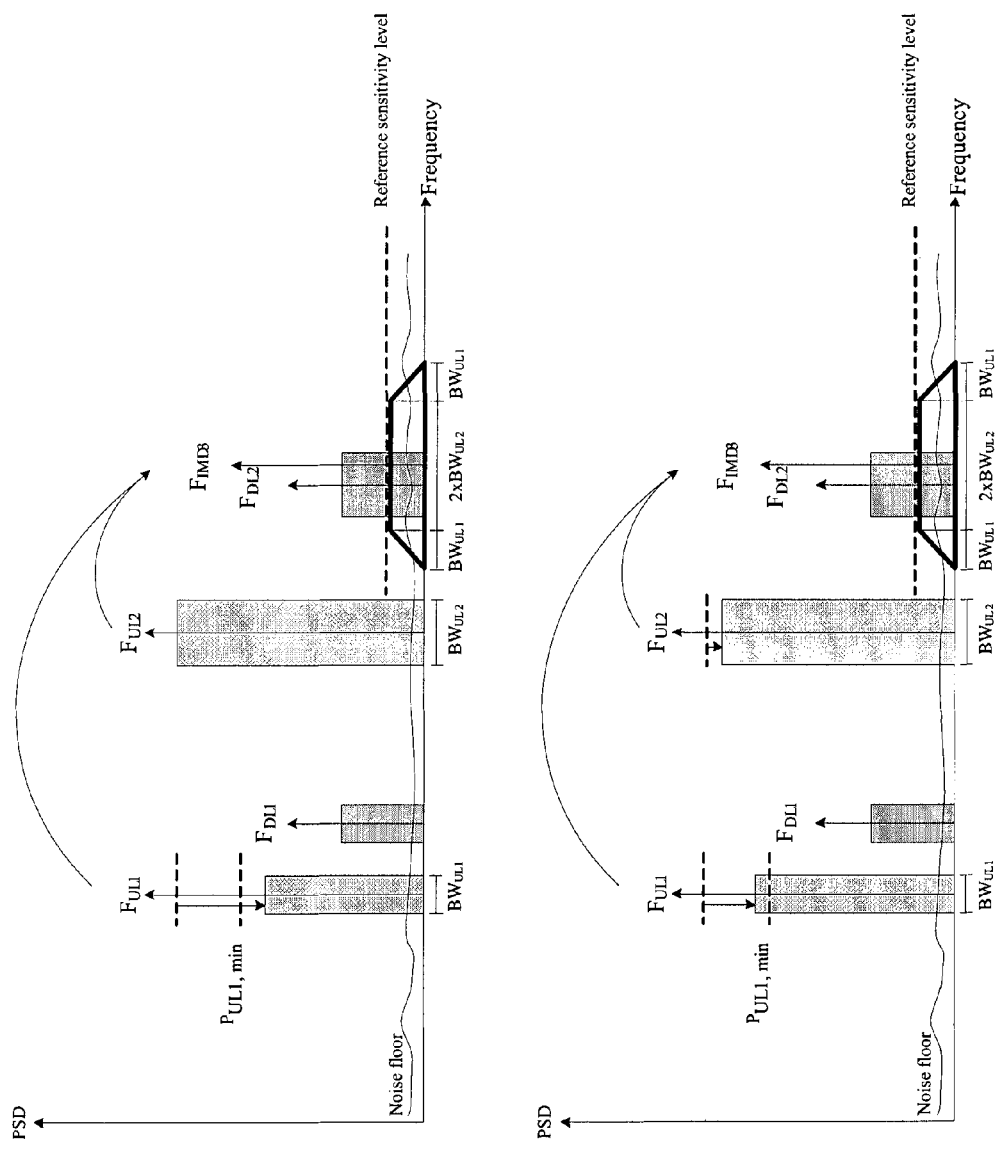
FIG. 7 shows a diagram of examples of third order intermodulation distortion on a downlink band with application of power control based on output power-related prioritization and link quality requirements according to embodiments of the present invention.

FIG. 7 shows a diagram of examples of third order intermodulation distortion on a downlink band with application of power control based on output power-related prioritization and link quality requirements according to embodiments of the present invention.

The examples of FIG. 7 illustrate how the eNB takes care that the coverage area or range in either of the cases does not get a limiting factor. In that case, the eNB can monitor its receiver signal power of both UL links and observe whether either of them is close to a limit, such as the limit value $P_{UL1,min}$ for UL1 shown in FIG. 7.

In the example of the upper part of FIG. 7, for UL2 performance point of view it would be best to decrease only the UL1 output power to keep IMD3 component at a sufficient level. However, a corresponding power reduction for the UL1 carrier would make the UL1 output power too small as compared to its coverage-related limit. Thus, the desired link quality to the eNB could not be ensured (due to coverage limitation, fading etc. . . . ). Therefore, in order to ensure a desired coverage area or range, the UL1 power is decreased only partially, i.e. less than actually/previously desired, and the remaining required power reduction is applied to the UL2 power, as shown in the lower part of FIG. 7. Thereby, by limiting both the UL1 power and the UL2 power, a compromise is established, which is sufficient for meeting all conditions and/or requirements in terms of power control and uplink quality.

Accordingly, the desensitization amount could be lowered in accordance with a prioritization based on uplink link quality on said uplink carrier with respect to a desired link quality for said uplink carrier, which corresponds to a desired coverage range.

Figure 8:
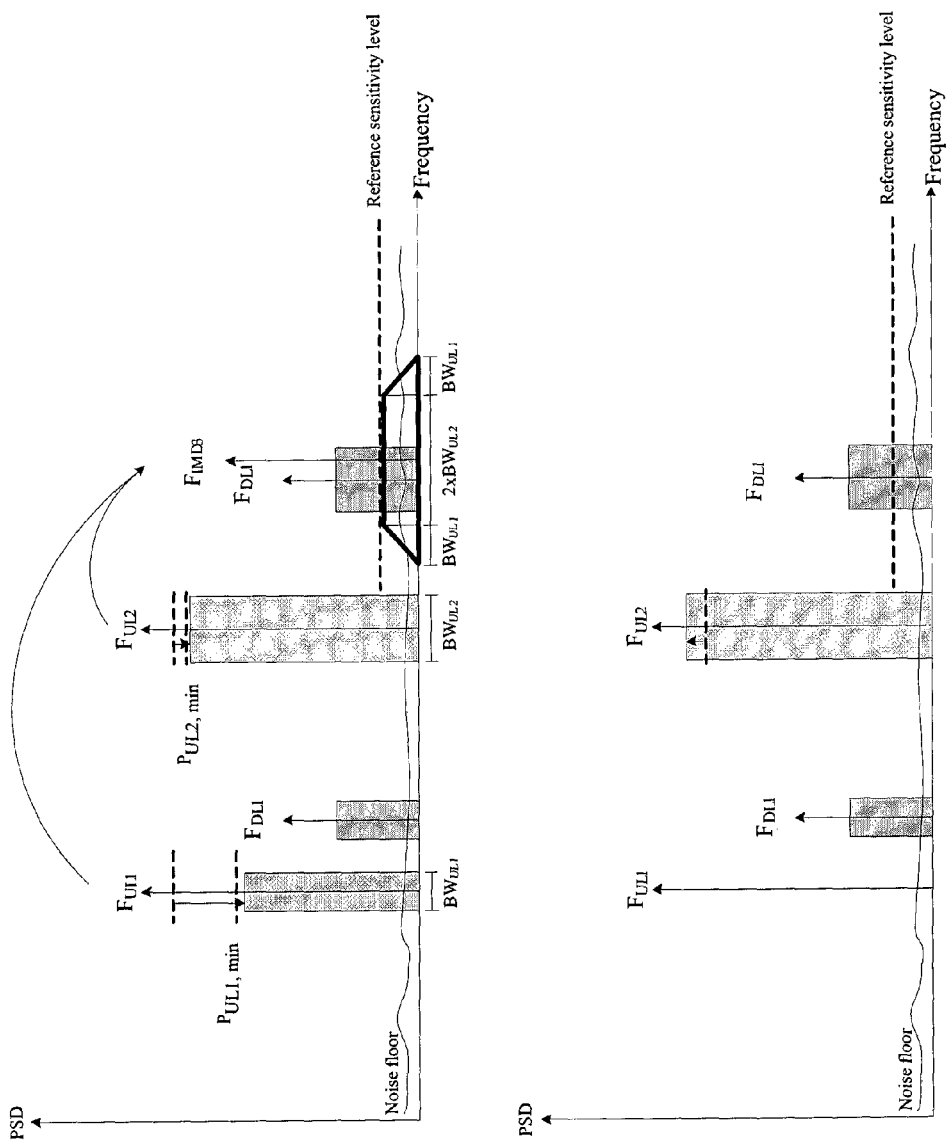
FIG. 8 shows a diagram of examples of third order intermodulation distortion on a downlink band with application of power control for uplink carrier deactivation according to embodiments of the present invention.
Figure 9:
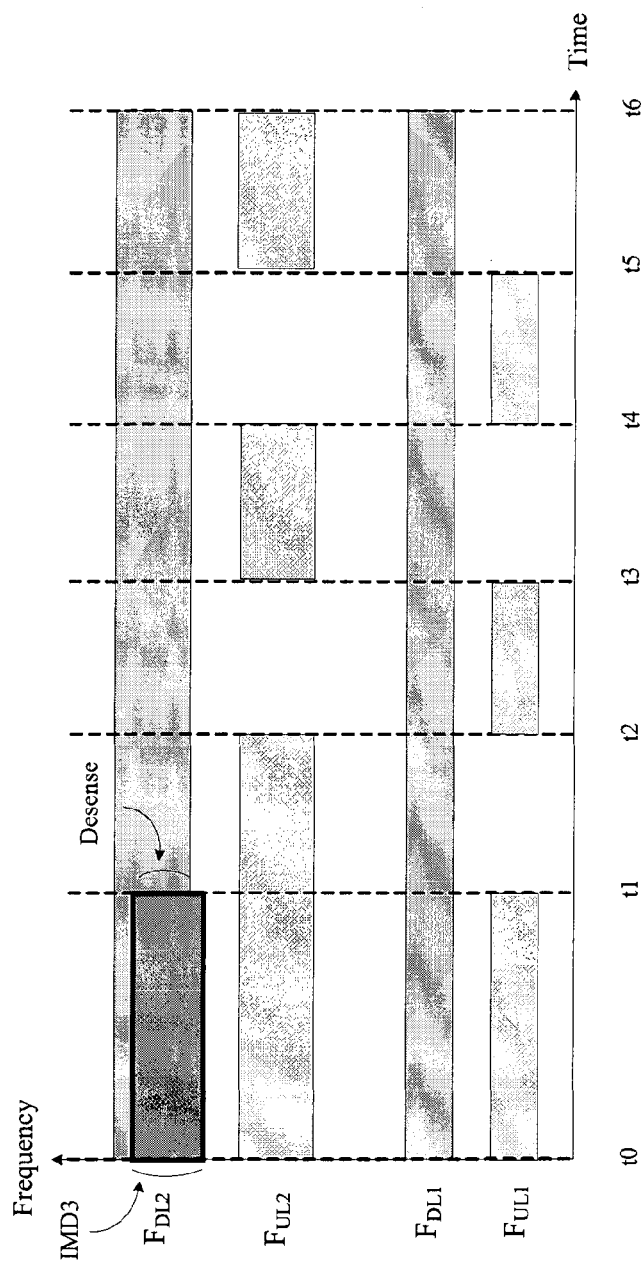
FIG. 9 shows a diagram of examples of third order intermodulation distortion on a downlink band with application of power control for discontinuous transmission according to embodiments of the present invention.

In case a power calculation shows too low UL powers from a coverage point of view, i.e. desired coverage requirements for all UL carriers could not be met with the calculated desired cumulative output power value, then it would be feasible to switch into single UL carrier (1UL) mode or alternatively switch between active UL carriers. This is illustrated in FIGS. 8 and 9 below. Irrespective thereof, another option would be to assign only such UL powers that the coverage requirements are not violated, which would naturally deteriorate at least one of the DL carriers due to IMD.

FIG. 8 shows a diagram of examples of third order intermodulation distortion on a downlink band with application of power control for uplink carrier deactivation according to embodiments of the present invention.

As is illustrated in the upper part of FIG. 8, coverage requirements would be violated on both UL carriers on the basis of the calculated desired cumulative output power value. That is, the setting of the output power values based on an output power-related prioritization on the basis of the uplink link qualities (i.e. coverage requirements) yields insufficient output power values for the two UL carriers. Then, the eNB can (continuously) set the output power of one of the UL carriers to zero and/or (based thereon) instruct power control for deactivation of one of the UL carriers. In the example of FIG. 8, the UL1 carrier is deactivated, and the power of the UL2 carrier can then again be increased (for example to its maximum), as long as not contravening other conditions or requirements in terms of power control.

FIG. 9 shows a diagram of examples of third order intermodulation distortion on a downlink band with application of power control for discontinuous transmission according to embodiments of the present invention.

In a situation corresponding to that in the upper part of FIG. 8, i.e. that coverage requirements would be violated on both UL carriers on the basis of the calculated desired cumulative output power value, the eNB can (alternately) set the output power of one of the UL carriers to zero and/or (based thereon) instruct power control for discontinuous transmission of the UL carriers. In the example of FIG. 9, (an overly high) desensitization of the DL2 carrier is caused in the period t0-t1 due to the simultaneous transmission with corresponding output powers on the UL1 and UL2 carriers. Accordingly, the eNB instructs discontinuous transmission (DTX) so as to avoid such IMD but still operate with multi UL carrier (2 UL). Thus, the two UL carriers transmit alternately rather than simultaneously. In the present example, the UL1 carrier transmits in the periods t2-t3, t4-t5, whereas the UL2 carrier transmits in the periods t1-t2, t3-t4 and t5-t6.

According to embodiments of the present invention as outlined above, an improved power control (i.e. power level scheduling/planning mechanism) for inter-band multi-carrier capable devices in terms of at least one of coverage and control flexibility, for example in the context of inter-band carrier aggregation, is achieved. Namely, by virtue of any one of the aforementioned aspects of the present invention, a power level scheduling mechanism is achieved, by which individual uplink carriers (at individual transmitters) at terminal devices are assignable such that intermodulation distortion is at least mitigated.

In this regard, a network entity is enabled to set/instruct output powers for individual uplink carriers at a terminal device more effectively and according to its preferences and/or respective conditions/requirements. Thus, the network entity knows exact output powers actually being used for individual uplink carriers at terminal devices based on such settings/instructions.

By virtue of embodiments of the present invention, there is thus provided a power control algorithm for the eNB or alike network entities for setting desired output powers for each TX chain (or antenna connector/port) of the terminal device in question.

Generally, it is to be noted that the above examples commonly assume a combination of two uplinks or two uplink carriers, respectively. Such assumption is made only by way of example in an effort to simplify explanation of the principles of the present invention and its embodiments. Irrespective thereof, any number of uplinks or uplink carriers could be combined and corresponding output power values could equally be calculated, signaled and applied as well. That is to say, embodiments of the present invention are not limited to a specific number of uplinks or uplink carriers to be combined.

Further, it is noted that the above examples mainly relate to second and third order intermodulation. Such relation is made only by way of example in an effort to simplify explanation of the principles of the present invention and its embodiments. Irrespective thereof, any kind, type, source, modulation and order of intermodulation could be equally considered as well. That is to say, embodiments of the present invention are not limited to a specific order intermodulation to be considered.

Generally, the above-described procedures and functions may be implemented by respective functional elements, processors, or the like, as described below.

While in the foregoing embodiments of the present invention are described mainly with reference to methods, procedures and functions, corresponding embodiments of the present invention also cover respective apparatuses, network nodes and systems, including both software, algorithms, and/or hardware thereof.

Respective embodiments of the present invention are described below referring to FIG. 10, whilst for the sake of brevity, reference is made to the detailed description with regard to FIGS. 1 to 9.

Figure 10:
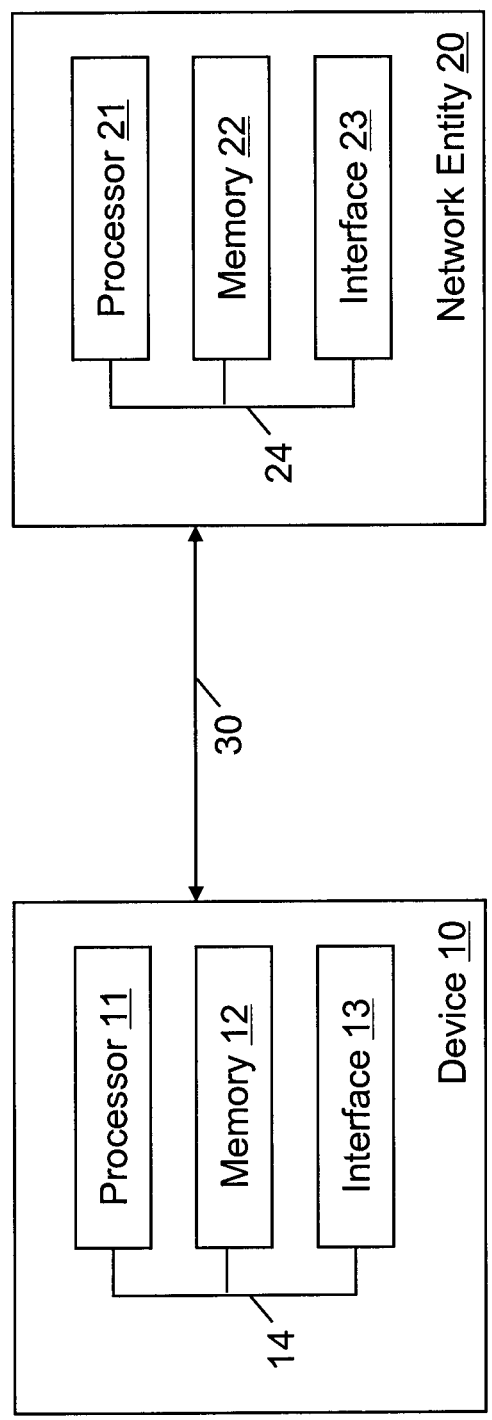
FIG. 10 shows a schematic block diagram illustrating exemplary apparatuses according to embodiments of the present invention.

In FIG. 10 below, which is noted to represent a simplified block diagram, the solid line blocks are configured to perform respective operations as described above. The entirety of solid line blocks are configured to perform the methods and operations as described above, respectively. With respect to FIG. 10, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (for example wired or wireless) and on the other hand may also comprise an arbitrary number of intermediary functional entities not shown. The direction of an arrow is meant to illustrate the direction in which certain operations are performed and/or the direction in which certain data is transferred.

Further, in FIG. 10, only those functional blocks are illustrated which relate to any one of the above-described methods, procedures and functions. A skilled person will acknowledge the presence of any other conventional functional blocks required for an operation of respective structural arrangements, such as for example a power supply, a central processing unit, respective memories or the like. Among others, memories are provided for storing programs or program instructions for controlling the individual functional entities to operate as described herein.

FIG. 10 shows a schematic block diagram illustrating exemplary apparatuses according to embodiments of the present invention.

In view of the above, the thus described apparatuses 10 and 20 are suitable for use in practicing the embodiments of the present invention, as described herein.

The thus described apparatus 10 may represent a (part of a) device or terminal such as a mobile station MS or user equipment UE or a modem (which may be installed as part of a MS or UE, but may be also a separate module, which can be attached to various devices), and may be configured to perform a procedure and/or functionality as described in conjunction with any one of FIGS. 1 and 3. The thus described apparatus 20 may represent a (part of a) network entity, such as a base station or access node or any network-based controller, for example an eNB, and may be configured to perform a procedure and/or functionality as described in conjunction with any one of FIGS. 1 and 3.

As indicated in FIG. 10, according to embodiments of the present invention, each of the apparatuses comprises a processing system or processor 11/21, a memory 12/22 and an interface 13/23, which are connected by a bus 14/24 or the like, and the apparatuses may be connected via link 30, respectively.

The processor 11/21 and/or the interface 13/23 may also include a modem or the like to facilitate communication over a (hardwire or wireless) link, respectively. The interface 13/23 may include a suitable transceiver coupled to one or more antennas or communication means for (wired or wireless) communications with the linked or connected device(s), respectively. The interface 13/23 is generally configured to communicate with at least one other apparatus, i.e. the interface thereof.

The memory 12/22 may store respective programs assumed to include program instructions or computer program code that, when executed by the respective processor, enables the respective electronic device or apparatus to operate in accordance with the embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processing system or processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

In its most basic form, according to embodiments of the present invention, the apparatus 10 or its processing system or processor 11 is configured to perform obtaining an instruction for power control for at least two uplink carriers of a terminal device with a setting of output power values of the at least two uplink carriers, said two uplink carriers operating on different bands (thus the apparatus comprising corresponding means for obtaining a power control instruction), and performing power control for the at least two uplink carriers in accordance with the obtained power control instruction at the terminal device (thus the apparatus comprising corresponding means for performing power control).

In its most basic form, according to embodiments of the present invention, the apparatus 20 or its processing system or processor 21 is configured to perform calculating a desired cumulative output power value for a combination of at least two uplink carriers of a terminal device, said two uplink carriers operating on different bands (thus the apparatus comprising corresponding means for calculating), setting an output power value for each of the at least two uplink carriers of the terminal device based on the calculated desired cumulative output power value (thus the apparatus comprising corresponding means for setting), and providing, for the terminal device, a power control instruction for the at least two uplink carriers at the terminal device in accordance with the output power values set for the at least two uplink carriers (thus the apparatus comprising corresponding means for providing a power control instruction or instructing).

For further details regarding the operability/functionality of the individual apparatuses, reference is made to the above description in connection with any one of FIGS. 1 to 9, respectively.

According to embodiments of the present invention, a system may comprise any conceivable combination of the thus depicted devices/apparatuses and other network elements, which are configured to cooperate with any one of them.

In general, it is to be noted that respective functional blocks or elements according to above-described aspects can be implemented by any known means, either in hardware and/or software/firmware, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software/firmware or by hardware without changing the ideas of the present invention. Such software may be software code independent and can be specified using any known or future developed programming language, such as for example Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Computer software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or embodiments thereof provide measures for enabling per-carrier power control for inter-band multi-carrier capable devices, such as for example inter-band carrier aggregation capable devices. Such measures may comprise calculating a desired cumulative output power value for a combination of at least two uplink carriers of a terminal device, said two uplink carriers operating on different bands, setting an output power value for each of the at least two uplink carriers of the terminal device based on the calculated desired cumulative output power value, and providing, for the terminal device, a power control instruction for the at least two uplink carriers at the terminal device in accordance with the output power values set for the at least two uplink carriers.

The measures according to embodiments of the present invention may be applied for any kind of network environment, such as for example for communication systems in accordance with 3GPP RAN1/RAN2/RAN3/RAN4 standards, i.e. LTE standards of release 10/11/12/ . . . (including LTE-Advanced and its evolutions) and/or UMTS standards and/or WCDMA standards and/or HSPA standards. In particular, the measures according to embodiments of the present invention may be applied to inter-band carrier aggregation which is a feature of 3GPP LTE standards of release 10/11/12 and onwards.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

LIST OF ACRONYMS AND ABBREVIATIONS

3GPP Third Generation Partnership Project
ANT Antenna
BW Bandwidth
CA Carrier Aggregation
CQI Channel Quality Indicator
DL Downlink
DTX Discontinuous Transmission
eNB evolved Node B (E-UTRAN base station)
E-UTRAN Evolved UTRAN
HSPA High Speed Packet Access
IIPn Input-referred Interception Point of n-th order
IMD Intermodulation Distortion
IMDn Intermodulation Distortion of n-th order
ISM band Industrial, Scientific and Medical band
LTE Long Term Evolution
LTE-A Long Term Evolution Advanced
PSD Power Spectral Density
RAT Radio Access Technology
RB Resource Block
RSRQ Reference Signal Received Quality
TX Transmitter/Transmission
UE User Equipment
UL Uplink
UMTS Universal Mobile Telecommunications System
UTRAN Universal Terrestrial Radio Access Network
WCDMA Wideband Code Division Multiple Access
WLAN Wireless Local Area Network

The invention claimed is:

1. A method for performing per-carrier power control on a network side of a wireless system, the method comprising:
   calculating, by circuitry of a network entity, a desired cumulative output power value for a combination of at least two uplink carriers of a terminal device, said two uplink carriers operating on different bands, the calculation being based on an intermodulation power equation for the intermodulation power of a specific order intermodulation distortion of the at least two uplink carriers;
   setting, by the circuitry, an output power value for each of the at least two uplink carriers of the terminal device based on the calculated desired cumulative output power value; and
   providing, for the terminal device, a power control instruction for the at least two uplink carriers at the terminal device in accordance with the output power values set for the at least two uplink carriers.

2. The method of claim 1, wherein the calculating is based on:
   an allowable intermodulation power parameter,
   an effective intermodulation power parameter, and
   one or more device-specific intermodulation performance parameters of the terminal device.

3. The method of claim 2, wherein:
the allowable intermodulation power parameter is determined in accordance with a target downlink performance at the terminal device, and/or
the intermodulation power equation and/or one or more of the parameters are fixed in accordance with pre-stored information or adjusted in accordance with at least one of parameter information received from the terminal device, which is indicative of values and/or combined values of one or more of the parameters, or feedback information received from the terminal device, which is indicative of downlink performance at the terminal device.

4. The method of claim 1, wherein the setting of the output power values is based on an output power-related prioritization of the at least two uplink carriers such that each uplink carrier is assigned an output power value in accordance with its prioritization level.

5. The method of claim 4, wherein the prioritization level of an uplink carrier is based on at least one of:
downlink performance on a downlink carrier, on which intermodulation distortion is caused by the output power of said uplink carrier, and the influence of the output power of said uplink carrier on the intermodulation distortion on said downlink carrier,
uplink capacity increase capability on said uplink carrier based on associated downlink performance deterioration on a downlink carrier, on which intermodulation distortion is caused by the output power of said uplink carrier,
a relationship between a frequency range of the band of said uplink carrier and a frequency range of intermodulation power of a specific order intermodulation distortion of the at least two uplink carriers,
a relationship between frequency ranges of the bands of the at least two uplink carriers,
channel allocations on the at least two uplink carriers, or uplink data amount on said uplink carrier.

6. The method according to claim 4, wherein the prioritization level of an uplink carrier is based on uplink link quality on said uplink carrier with respect to a desired link quality for said uplink carrier.

7. The method of claim 6, wherein, when the setting of the output power values based on an output power-related prioritization on the basis of the uplink link qualities of the at least two uplink carriers yields insufficient output power values for the at least two uplink carriers with respect to the desired link qualities for said uplink carriers, the instruction comprises a power control instruction for:
deactivation of one of the at least two uplink carriers by continuous setting of the output power value of one of the at least two uplink carriers to zero, or
discontinuous transmission of the at least two uplink carriers by alternate setting of the output power value of one of the at least two uplink carriers to zero.

8. The method of claim 1, wherein:
the network entity is a base station or access node of the wireless system, and/or
the method is operable in at least one of a LTE and a LTE-A wireless system, and/or
the combination of the at least two uplink carriers of the terminal device, for which the desired cumulative output power value is calculated, constitutes an inter-band carrier aggregation.

9. The method of claim 1, wherein the network entity is a base station and the circuitry is one or more processors of the base station.

10. A method for performing per-carrier power control on a terminal side of a wireless system, the method comprising:
obtaining, by circuitry of a terminal device, an instruction for power control for at least two uplink carriers of the terminal device, the instruction comprising a setting of output power values of the at least two uplink carriers, said two uplink carriers operating on different bands, the setting being based on a desired cumulative output power value for a combination of the at least two uplink carriers of the terminal device, which is based on an intermodulation power equation for the intermodulation power of a specific order intermodulation distortion of the at least two uplink carriers; and
performing, by the circuitry, power control for the at least two uplink carriers in accordance with the obtained power control instruction at the terminal device.

11. The method of claim 10, further comprising at least one of:
providing parameter information from the terminal device in an uplink direction, which is indicative of values and/or combined values of one or more of an allowable intermodulation power parameter, an effective intermodulation power parameter and one or more device-specific intermodulation performance parameters of the terminal device;
providing feedback information from the terminal device in an uplink direction, which is indicative of downlink performance at the terminal device; or
providing link quality information from the terminal device in an uplink direction, which is indicative of uplink link quality on the at least two uplink carriers.

12. The method of claim 10, wherein the power control comprises:
deactivation of one of the at least two uplink carriers in accordance with continuous setting of the output power value of one of the at least two uplink carriers to zero in the obtained power control instruction, or
discontinuous transmission of the at least two uplink carriers in accordance with alternate setting of the output power value of one of the at least two uplink carriers to zero in the obtained power control instruction.

13. The method of claim 10, wherein:
the terminal device is a terminal, user equipment, mobile station or modem, and/or
the method is operable in at least one of a LTE and a LTE-A wireless system, and/or
a combination of the at least two uplink carriers of the terminal device, for which the setting of the output power values is made, constitutes an inter-band carrier aggregation.

14. The method of claim 10, wherein the circuitry is one or more processors of the terminal device.

15. An apparatus for use in performing per-carrier power control on a network side of a wireless system, the apparatus comprising a processing system configured to cause the apparatus to:
calculate a desired cumulative output power value for a combination of at least two uplink carriers of a terminal device, said two uplink carriers operating on different bands, the calculation being based on an intermodulation power equation for the intermodulation power of a specific order intermodulation distortion of the at least two uplink carriers;
set an output power value for each of the at least two uplink carriers of the terminal device based on the calculated desired cumulative output power value; and
provide, for the terminal device, a power control instruction for the at least two uplink carriers at the terminal device in accordance with the output power values set for the at least two uplink carriers.

16. The apparatus of claim 15, wherein the calculating is based on:
  an allowable intermodulation power parameter,
  an effective intermodulation power parameter, and
  one or more device-specific intermodulation performance parameters of the terminal device.

17. The apparatus of claim 16, wherein the processing system is configured to cause the apparatus to:
  determine the allowable intermodulation power parameter in accordance with a target downlink performance at the terminal device; and/or
  fix the intermodulation power equation and/or one or more of the parameters in accordance with pre-stored information or adjust the intermodulation power equation and/or one or more of the parameters in accordance with at least one of parameter information received from the terminal device, which is indicative of values and/or combined values of one or more of the parameters, and feedback information received from the terminal device, which is indicative of downlink performance at the terminal device.

18. The apparatus of claim 15, wherein the processing system is configured to cause the apparatus to set the output power values based on an output power-related prioritization of the at least two uplink carriers such that each uplink carrier is assigned an output power value in accordance with its prioritization level.

19. The apparatus of claim 18, wherein the prioritization level of an uplink carrier is based on at least one of:
  downlink performance on a downlink carrier, on which intermodulation distortion is caused by the output power of said uplink carrier, and the influence of the output power of said uplink carrier on the intermodulation distortion on said downlink carrier,
  uplink capacity increase capability on said uplink carrier based on associated downlink performance deterioration on a downlink carrier, on which intermodulation distortion is caused by the output power of said uplink carrier,
  a relationship between a frequency range of the band of said uplink carrier and a frequency range of intermodulation power of a specific order intermodulation distortion of the at least two uplink carriers,
  a relationship between frequency ranges of the bands of the at least two uplink carriers,
  channel allocations on the at least two uplink carriers, or
  uplink data amount on said uplink carrier.

20. The apparatus of claim 18, wherein the prioritization level of an uplink carrier is based on uplink link quality on said uplink carrier with respect to a desired link quality for said uplink carrier, which corresponds to a desired coverage range.

21. The apparatus of claim 20, wherein, when the setting of the output power values based on an output power-related prioritization on the basis of the uplink link qualities of the at least two uplink carriers yields insufficient output power values for the at least two uplink carriers with respect to the desired link qualities for said uplink carriers, the processing system is configured to cause the apparatus to provide a power control instruction for:
  deactivation of one of the at least two uplink carriers by continuous setting of the output power value of one of the at least two uplink carriers to zero, or
  discontinuous transmission of the at least two uplink carriers by alternate setting of the output power value of one of the at least two uplink carriers to zero.

22. The apparatus of claim 15, wherein:
  the apparatus is operable as or at a base station or access node of the wireless system, and/or
  the apparatus is operable in at least one of a LTE and a LTE-A wireless system, and/or
  the combination of the at least two uplink carriers of the terminal device, for which the desired cumulative output power value is calculated, constitutes an inter-band carrier aggregation.

23. The apparatus of claim 15, wherein the processing system is one or more processors included in the apparatus.

24. An apparatus for use in performing per-carrier power control on a terminal side of a wireless system, the apparatus comprising a processing system configured to cause the apparatus to:
  obtain a power control instruction for at least two uplink carriers of a terminal device, the instruction comprising a setting of output power values of the at least two uplink carriers, said two uplink carriers operating on different bands, the setting being based on a desired cumulative output power value for a combination of the at least two uplink carriers of the terminal device, which is based on an intermodulation power equation for the intermodulation power of a specific order intermodulation distortion of the at least two uplink carriers; and
  perform power control for the at least two uplink carriers in accordance with the obtained power control instruction at the terminal device.

25. The apparatus of claim 24, wherein the processing system is configured to cause the apparatus to perform at least one of:
  provide parameter information from the terminal device in an uplink direction, which is indicative of values and/or combined values of one or more of an allowable intermodulation power parameter, an effective intermodulation power parameter and one or more device-specific intermodulation performance parameters of the terminal device,
  provide feedback information from the terminal device in an uplink direction, which is indicative of downlink performance at the terminal device, or
  provide link quality information from the terminal device in an uplink direction, which is indicative of uplink link quality on the at least two uplink carriers.

26. The apparatus of claim 24, wherein the processing system is configured to cause the apparatus to perform in the power control:
  deactivation of one of the at least two uplink carriers in accordance with continuous setting of the output power value of one of the at least two uplink carriers to zero in the obtained power control instruction, or
  discontinuous transmission of the at least two uplink carriers in accordance with alternate setting of the output power value of one of the at least two uplink carriers to zero in the obtained power control instruction.

27. The apparatus of claim 24, wherein:
  the apparatus is operable as or at a terminal, user equipment, mobile station or modem, and/or
  the apparatus is operable in at least one of a LTE and a LTE-A wireless system, and/or
  a combination of the at least two uplink carriers of the terminal device, for which the setting of the output power values is made, constitutes an inter-band carrier aggregation.

28. The apparatus of claim 24, wherein the processing system is one or more processors included in the apparatus.

* * * * *